(12) United States Patent
Yabuki et al.

(10) Patent No.: US 12,180,325 B2
(45) Date of Patent: Dec. 31, 2024

(54) POLYCARBONATE DIOLS AND THEIR USES

(71) Applicant: ASAHI KASEI KABUSHIKI KAISHA, Tokyo (JP)

(72) Inventors: Hayato Yabuki, Tokyo (JP); Eizaburou Ueno, Tokyo (JP); Yasuyuki Tsukimori, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 641 days.

(21) Appl. No.: 17/436,391

(22) PCT Filed: Feb. 20, 2020

(86) PCT No.: PCT/JP2020/006909
§ 371 (c)(1),
(2) Date: Sep. 3, 2021

(87) PCT Pub. No.: WO2020/179483
PCT Pub. Date: Sep. 10, 2020

(65) Prior Publication Data
US 2022/0144997 A1 May 12, 2022

(30) Foreign Application Priority Data
Mar. 7, 2019 (JP) .................. 2019-041555

(51) Int. Cl.
*C08G 18/32* (2006.01)
*C08G 18/10* (2006.01)

(52) U.S. Cl.
CPC ......... *C08G 18/3206* (2013.01); *C08G 18/10* (2013.01)

(58) Field of Classification Search
CPC .............. C08G 64/0208; C08G 18/44
See application file for complete search history.

(56) References Cited

U.S. PATENT DOCUMENTS

| | | | |
|---|---|---|---|
| 4,808,691 A | 2/1989 | Konig et al. | |
| 2004/0092699 A1 | 5/2004 | Ueno et al. | |
| 2007/0155933 A1 | 7/2007 | Watanabe et al. | |
| 2008/0146766 A1 | 6/2008 | Tetsuo et al. | |
| 2015/0291724 A1* | 10/2015 | Kusano | D06N 3/146 |
| | | | 524/591 |
| 2016/0181616 A1 | 6/2016 | Takahashi et al. | |
| 2017/0051104 A1 | 2/2017 | Lin et al. | |
| 2019/0315908 A1 | 10/2019 | Hioki et al. | |

FOREIGN PATENT DOCUMENTS

| | | | |
|---|---|---|---|
| EP | 1 371 675 A | | 12/2003 |
| EP | 1 849 814 A | | 10/2007 |
| GB | 1263225 A | | 2/1972 |
| JP | S63-305127 A | | 12/1988 |
| JP | H05-029648 A | | 5/1993 |
| JP | H5-029648 B | | 5/1993 |
| JP | H05-0296648 B | | 5/1993 |
| JP | H05-186631 A | | 7/1993 |
| JP | 2003-113237 | * | 4/2003 |
| JP | 2003-113237 A | | 4/2003 |
| JP | 2005-232447 A | | 9/2005 |
| JP | 2014-136783 | * | 7/2014 |
| JP | 2014-136783 A | | 7/2014 |
| JP | 2015-143316 | | 8/2015 |
| JP | 2017-039913 A | | 2/2017 |
| JP | 2017-071685 A | | 4/2017 |
| JP | 2017-078150 A | | 4/2017 |
| JP | 2017-137406 A | | 8/2017 |
| JP | 2018-053266 A | | 4/2018 |
| JP | 2019-019304 A | | 2/2019 |

OTHER PUBLICATIONS

Translation of JP 2003-113237 (Year: 2003).*
Translation of JP 2014-136783 (Year: 2014).*
ISR issued in WIPO Patent Application No. PCT/JP2020/006909, May 19, 2020, English translation.
IPRP issued in WIPO Patent Application No. PCT/JP2020/006909, Aug. 25, 2021, English translation.
Supplementary European Search Report issued in EP Patent Application No. 20767123.1, Feb. 11, 2022.

* cited by examiner

*Primary Examiner* — Robert C Boyle
(74) *Attorney, Agent, or Firm* — Greenblum & Bernstein, P.L.C.

(57) ABSTRACT

A polycarbonate diol comprising a repeating unit represented by the following formula (A) in a proportion of 0.1% by mass or more and 99.9% by mass or less:

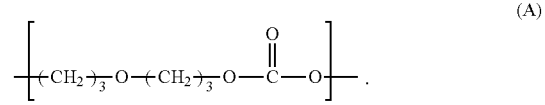

20 Claims, No Drawings

POLYCARBONATE DIOLS AND THEIR USES

The present application is based on Japanese Patent Application No. 2019-041555 filed on Mar. 7, 2019, the contents of which are incorporated herein by reference.

TECHNICAL FIELD

The present invention relates to polycarbonate diols and their uses.

BACKGROUND ART

Polycarbonate polyols have been conventionally proposed to be used as a soft segment of polyurethanes or elastomers in order to provide excellent heat resistance, weather resistance, hydrolysis resistance, oil resistance and chemical resistance.

Such polycarbonate polyols that have been generally used are polycarbonate polyols prepared by using 1,6-hexanediol alone as a diol component. However, such polycarbonate polyols have a problem of difficulty in handling, because they are crystalline and they are thereby solid at normal temperature.

Aliphatic copolycarbonate diols prepared by using two or more polyols are disclosed in order to solve these problems. For example, Patent Document 1 discloses that a polycarbonate diol was synthesized by using 1,5-pentanediol and 1,6-hexanediol. Further, for example, Patent Document 2 discloses that a polycarbonate diol was synthesized by using dipropylene glycol having a branched chain and hexanediol. The resulting polycarbonate diol has its structural regularity interfered, and is reduced in crystallinity and is thereby liquid at normal temperature. It has been found that polyurethanes prepared by using these polycarbonate diols are excellent in flexibility.

LIST OF PRIOR ART DOCUMENTS

Patent Document

Patent Document 1
  Japanese Patent Publication No. 05-29648
Patent Document 2
  Japanese Patent Laid-Open No. 2014-136783

SUMMARY OF INVENTION

Problems to be Solved by Invention

However, the polyurethanes obtained by using, as a raw material compound, a polycarbonate diol as described in Patent Documents 1 or 2 has room for improvement in stain resistance. That is, such a polycarbonate diol, capable of providing excellent stain resistance, low temperature flexibility and heat resistance when used as a raw material compound for a polyurethane or the like, has not been so far obtained.

Accordingly, an object of the present invention is to provide a novel polycarbonate diol capable of providing excellent stain resistance, low temperature flexibility and heat resistance when used, for example, as a raw material compound for a polyurethane, as well as its uses.

Means for Solving Problems

As a result of diligent research to solve the above-described problems, the present inventors have found that a polycarbonate diol comprising a particular repeating unit in a particular proportion is noncrystalline and that when used as a raw material compound for a polyurethane or thermoplastic elastomer, it can provide better stain resistance, low temperature flexibility and heat resistance, as compared to when a common polycarbonate polyol is used, to complete the present invention.

That is, the present invention is as follows:

(1)
A polycarbonate diol comprising a repeating unit represented by the following formula (A) in a proportion of 0.1% by mass or more and 99.9% by mass or less:

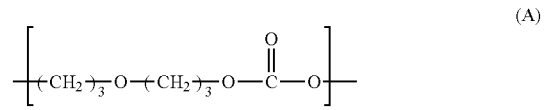

(2)
The polycarbonate diol according to (1), wherein the proportion of the repeating unit represented by the formula (A) is 0.1% by mass or more and 50.0% by mass or less.

(3)
The polycarbonate diol according to (1) or (2), further comprising a repeating unit represented by the following formula (B) in a proportion of 0.1% by mass or more and 99.9% by mass or less:

wherein R represents a divalent hydrocarbon group having 3 to 20 carbon atoms which optionally comprises an oxygen atom in its carbon backbone.

(4)
The polycarbonate diol according to (3), wherein R in the formula (B) has 3 to 6 carbon atoms.

(5)
The polycarbonate diol according to any of (1) to (4), wherein the polycarbonate diol has a number average molecular weight of 300 or more and 4,000 or less.

(6)
The polycarbonate diol according to any of (1) to (5), wherein the polycarbonate diol has a proportion of a primary hydroxyl terminal of 90% or more.

(7)
A coating composition comprising the polycarbonate diol according to any of (1) to (6).

(8)
An aqueous polyurethane dispersion comprising a water-dispersible polyurethane obtained by using the polycarbonate diol according to any of (1) to (6), and water.

(9)
A water-based coating composition comprising the aqueous polyurethane dispersion according to (8).

(10)
An elastomer obtained by reacting the polycarbonate diol according to any of (1) to (6) with an isocyanate compound.

Advantages of Invention

The present invention can provide a polycarbonate diol capable of providing excellent stain resistance, low temperature flexibility and heat resistance when used, for example, as a raw material compound for a polyurethane or thermoplastic elastomer, as well as its uses.

MODE FOR CARRYING OUT INVENTION

Hereinafter, modes for carrying out the present invention (a mode for carrying out the present invention is hereinafter abbreviated as "the present embodiment") will be described in detail. The present invention is not limited to the following embodiments, but can be variously varied and carried out within the spirit thereof.

The terms "stain resistance", "low temperature flexibility" and "heat resistance" as used herein respectively refer to properties capable of providing stain resistance, low temperature flexibility and heat resistance when a polycarbonate diol of the present embodiment is used as a raw material compound for a polyurethane or thermoplastic elastomer. The stain in "stain resistance" includes household stains such as those resulting from oil-based pens and blue jeans, and food stains such as those resulting from coffee, ketchup and olive oil.

[Polycarbonate Diol]

A polycarbonate diol of the present embodiment comprises a repeating unit represented by the following formula (A) in a proportion of 0.1% by mass or more and 99.9% by mass or less. The polycarbonate diol of the present embodiment preferably comprises a repeating unit represented by the following formula (B) in a proportion of 0.1% by mass or more and 99.9% by mass or less. R in the following formula (B) more preferably has 3 to 6 carbon atoms. The polycarbonate diol of the present embodiment preferably has a number average molecular weight of 300 or more and 4,000 or less. Further, the polycarbonate diol of the present embodiment preferably has a proportion of a primary hydroxyl terminal of 90% or more.

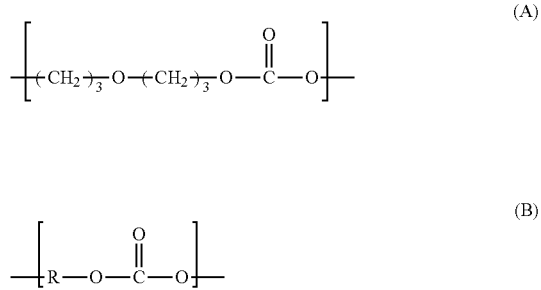

wherein R represents a divalent hydrocarbon group having 3 to 20 carbon atoms which optionally comprises an oxygen atom in its carbon backbone.

The polycarbonate diol of the present embodiment can provide excellent stain resistance and low temperature flexibility when used, for example, as a raw material compound for a polyurethane or elastomer by having the above-described features. The mechanism by which the polycarbonate diol of the present embodiment exerts these effects is not clear, but it is presumed as follows. However, the present invention is not limited by this presumption in any way. The effect of disturbing the structural regularity of the polycarbonate diol is suitably obtained is mainly for the reason that the polycarbonate diol comprises a repeating unit represented by the formula (A) in a particular proportion. For this reason, it is presumed that the polycarbonate diol of the present embodiment has no orientation for crystallization and can thereby provide excellent stain resistance and low temperature flexibility when used, for example, as a raw material compound for a polyurethane or elastomer.

The polycarbonate diol of the present embodiment comprises a repeating unit represented by the formula (A) in a proportion of 0.1% by mass or more and 99.9% by mass or less, preferably 0.1% by mass or more and 50.0% by mass or less and more preferably 1.0% by mass or more and 30.0% by mass or less. The polycarbonate diol of the present embodiment is excellent in stain resistance and low temperature flexibility when the above proportion is 0.1% by mass or more and is excellent in heat resistance when the above proportion is 99.9% by mass or less.

The proportion of the repeating unit represented by the formula (A) is that determined according to the following procedure:

1) Into a 100 mL eggplant-shaped flask are charged M g (approximately 1 g) of a polycarbonate diol, 30 g of ethanol and 4 g of potassium oxide and they are allowed to react at 100° C. for one hour to obtain a hydrolyzate.

2) The hydrolyzate is allowed to cool to room temperature followed by addition of two or three drops of phenolphthalein, is neutralized with hydrochloric acid and is cooled in a refrigerator for one hour.

3) C mol (approximately 0.5 g) of diethylene glycol diethyl ether is added as an internal standard followed by 30 g of acetone to precipitate a salt, and the precipitated salt is removed by filtration.

4) By gas chromatography, the peak area ratio D of the peak area of 4-oxa-1,7-heptanediol to the peak area of the internal standard is determined under the following conditions:

System: GC-2014 Gas Chromatograph (a product manufactured by Shimadzu Corporation, Japan);

Column: DB-WAX (a product manufactured by J & W, USA);

Detector: FID; and

Temperature rise profile: holding at 100° C. for five minutes followed by raising the temperature to 250° C. at 10° C./minute.

5) 0.1 Gram of 4-oxa-1,7-heptanediol, 0.5 g of an internal standard (diethylene glycol diethyl ether) and 30 g of ethanol are mixed and gas chromatography analysis is carried out under the same conditions as in 4) above to calculate a factor f.

6) The proportion of the repeating unit represented by the formula (A) is calculated from the peak area ratio D and the factor f according to the following expression:

Proportion of repeating unit represented by formula $(A) = (f \times C \times D \times 160/M) \times 100$ wherein "160" represents the molecular weight of the repeating unit represented by the formula (A).

The polycarbonate diol of the present embodiment preferably further comprises a repeating unit represented by the formula (B) in a proportion of 0.1% by mass or more and 99.9% by mass or less. The polycarbonate diol of the present embodiment comprises a repeating unit represented by the formula (B) more preferably in a proportion of 50.0% by mass or more and 99.9% by mass or less and further more preferably in a proportion of 70.0% by mass or more and 99.0% by mass or less. The polycarbonate diol of the present embodiment, having the repeating unit represented by the formula (B) in the above-described range, tends to be more excellent in stain resistance, low temperature flexibility and heat resistance.

The proportion of the sum of the repeating unit represented by the formula (A) and the repeating unit represented by the formula (B) in the polycarbonate diol of the present embodiment is preferably at least 50% by mass, more preferably 60% by mass or more, further more preferably 70% by mass and particularly preferably 80% by mass. When the proportion of the sum of the repeating unit represented by the formula (A) and the repeating unit represented by the formula (B) in the polycarbonate diol of the present embodiment is the lower limit value described above or more, the stain resistance and heat resistance tend to be particularly excellent. The upper limit value of the proportion of the sum of the repeating unit represented by the formula (A) and the repeating unit represented by the formula (B) is not particularly limited, but is, for example, 100% by mass.

In the present embodiment, the proportion of the repeating unit represented by the formula (B) can be determined by the method hereinbelow described in Example.

Examples of the divalent hydrocarbon group having 3 to 20 carbon atoms, which optionally comprises an oxygen atom, represented by R in the formula (B) include, but not particularly limited to, hydrocarbon groups such as linear diols, branched diols, cyclic diols and ether group-containing diols. Examples of the linear diols include, but not particularly limited to, 1,3-propanediol, 1,4-butanediol, 1,5-pentanediol, 1,6-hexanediol, 1,7-heptanediol, 1,8-octanediol, 1,9-nonanediol, 1,10-decanediol and 1,12-dodecanediol. Examples of the branched diols include, but not particularly limited to, 1,3-butanediol, 2-methyl-1,3-propanediol, 2-ethyl-1,3-propanediol, neopentyl glycol, 3-methyl-1,5-pentanediol and 2-methyl-1,8-octanediol. Examples of the cyclic diols include, but not particularly limited to, 1,2-cyclohexanediol, 1,3-cyclohexanediol, 1,4-cyclohexanediol, 1,4-cyclohexanedimethanol and 2,2'-bis(4-hydroxycyclohexyl)propane. Examples of the ether group-containing diols include, but not particularly limited to, diethylene glycol, dipropylene glycol, 3-oxa-1,6-hexanediol, 3-oxa-1,7-heptanediol, 3-oxa-1,8-octanediol, 3-oxa-1,9-nonanediol, 5-methyl-3-oxa-1,6-hexanediol and 6-methyl-3-oxa-1,8-octanediol.

Among them, the polycarbonate diol in which R in the formula (B) has 3 to 6 carbon atoms is preferable, because it tends to further improve at least one of physical properties such as low temperature flexibility, heat resistance, abrasion resistance, elongation and breaking strength of a polyurethane. In particular, the polycarbonate diol in which R in the formula (B) has 3 carbon atoms is particularly preferable, because it tends to further improve the low temperature flexibility of a polyurethane.

The number average molecular weight of the polycarbonate diol of the present embodiment is preferably 300 or more and 4,000 or less, more preferably 350 or more and 3,000 or less and further more preferably 400 or more and 2,400 or less. The polycarbonate diol of the present embodiment tends to be more excellent in flexibility and low temperature properties when the number average molecular weight is 300 or more, and the polycarbonate diol of the present embodiment tends to be further improved in low viscosity and moldability when the number average molecular weight is 4,000 or less. The number average molecular weight of the polycarbonate diol can be determined by the method hereinbelow described in the Example.

The polycarbonate diol of the present embodiment has preferably the proportion of a primary hydroxyl terminal of 90% or more, more preferably 95% or more and further preferably 97% or more. The upper limit value of the proportion of the primary hydroxyl terminal is not particularly limited, but it is practically 100%. When the polycarbonate diol of the present embodiment is used as a raw material compound for producing (synthetizing) a polyurethane (particularly a thermoplastic polyurethane), the proportion of the primary hydroxyl terminal in the above range provide a polyurethane which has a high molecular weight and tends to have a high heat resistance.

In the present embodiment, the proportion of the primary hydroxyl terminal is that determined according to the following procedure.

The proportion of the primary hydroxyl terminal is calculated from the integral values of peaks of $^1$H-NMR measured at 400 MHz (ECS400 manufactured by JEOL Ltd., Japan) for a polycarbonate diol dissolved in $CDCl_3$ (deuterated chloroform). The proportion of the primary hydroxyl terminal is determined from the ratio of integral value for one proton of the primary hydroxyl terminal to the sum of the integral value for one proton of all the hydroxyl terminals of the polycarbonate diol and the integral value for one proton of carbonate ester-derived terminals such as a phenoxide terminal. The detection limit of the proportion of the primary hydroxyl terminal is 1.0 mol % based on the entire structures of the polycarbonate diol terminals.

[Process for Producing Polycarbonate Diol]

A method for producing the polycarbonate diol of the present embodiment will be now illustrated.

Examples of the method for producing the polycarbonate diol of the present embodiment include, but not particularly limited to, a method comprising transesterification reaction of a diol component comprising 4-oxa-1,7-heptanediol and a diol compound represented by the formula (C): HO—R—OH, wherein R represents a divalent hydrocarbon group having 3 to 20 carbon atoms which optionally comprises an oxygen atom in its carbon backbone, with a carbonate ester. The diol component may further contain another polyol.

4-Oxa-1,7-heptanediol may be a petroleum-derived compound or a plant-derived compound. It may also be purchased as a reagent or obtained by reduction of diethyl 3,3'-oxydipropionate. Even if using 4-oxa-1,7-heptanediol of any source, there is no difference in the physical properties of a polyurethane obtained by reacting a polycarbonate diol and an isocyanate.

Specific examples of the diol compound represented by the formula (C) include, but not particularly limited to, linear diols such as 1,3-propanediol, 1,4-butanediol, 1,5-pentanediol, 1,6-hexanediol, 1,7-heptanediol, 1,8-octanediol, 1,9-nonanediol, 1,10-decanediol and 1,12-dodecanediol; branched diols such as 1,3-butanediol, 2-methyl-1,3-propanediol, 2-ethyl-1,3-propanediol, neopentyl glycol, 3-methyl-1,5-pentanediol and 2-methyl-1,8-octanediol; cyclic diols such as 1,2-cyclohexanediol, 1,3-cyclohexanediol, 1,4-cyclohexanediol, 1,4-cyclohexanedimethanol and 2,2'-bis(4-hydroxycyclohexyl)propane; and ether group-containing diols such as diethylene glycol, dipropylene glycol, 3-oxa-1,6-hexanediol, 3-oxa-1,7-heptanediol, 3-oxa-1,8-octanediol, 3-oxa-1,9-nonanediol, 5-methyl-3-oxa-1,6-hexanediol and 6-methyl-3-oxa-1,8-octanediol.

These diol compounds may be used alone or in combination of two or more. Among these, the diol compounds having 3 to 6 carbon atoms are preferable. The polyurethane produced using the diol compound having the number of carbon atoms in the above range tends to be excellent in at least one of abrasion resistance, breaking strength and elongation. The trimethylene group having 3 carbon atoms is more preferable. The polyurethane produced using the diol compound having the number of carbon atoms in the above range tends to be excellent in low temperature flexibility.

Examples of the carbonate ester include, but not particularly limited to, alkylene carbonates, dialkyl carbonates and diaryl carbonates. Examples of the alkylene carbonates include, but not particularly limited to, ethylene carbonate, trimethylene carbonate, 1,2-propylene carbonate, 1,2-butylene carbonate, 1,3-butylene carbonate and 1,2-pentylene carbonate. Examples of the dialkyl carbonates include, but not particularly limited to, dimethyl carbonate, diethyl carbonate, linear dibutyl carbonate and branched-chain dibutyl carbonate. Examples of the dialkylene carbonates include, but not particularly limited to, diphenyl carbonate. These carbonate esters may be used alone or in combination of two or more. Among them, the carbonate ester is preferably ethylene carbonate, dimethyl carbonate, diethyl carbonate, linear butyl carbonate or branched-chain dibutyl carbonate.

The reaction temperature for the transesterification in the production method of the present embodiment is, but not particularly limited to, preferably 120 to 280° C. and more preferably 140 to 230° C.

In the production method of the present embodiment, a catalyst may be used during the transesterification reaction, from the viewpoint of enhancing the reaction rate. Examples of the catalyst include, but not particularly limited to, titanium compounds such as titanium tetraisopropoxide and titanium tetra-n-butoxide; tin compounds such as di-n-butyltin dilaurate, di-n-butyltin oxide and dibutyltin diacetate; and metal acetates such as magnesium acetate, calcium acetate, zinc acetate and lead acetate. These catalysts may be used alone or in combination of two or more. Among them, titanium compounds are preferably used. The content of each of the catalysts is preferably 1 ppm by mass or more and 300 ppm by mass or less, and more preferably 30 ppm by mass or more and 200 ppm by mass or less, based on the total amount of the raw materials for the reaction.

Examples of the method for producing the polycarbonate diol of the present embodiment also include, but not particularly limited to, a method comprising adding 4-oxa-1,7-heptanediol to a polycarbonate diol and subjecting to transesterification reaction to obtain a polycarbonate diol. The polycarbonate diol used may be obtained by transesterification reaction of the diol compound represented by the formula (C) with the carbonate ester described above, or may be obtained by ring opening of a cyclic carbonate.

[Coating Composition]

The coating composition of the present embodiment comprises the above-described polycarbonate diol.

<Isocyanate Compounds>

The coating composition of the present embodiment may comprise an isocyanate compound. When the coating composition of the present embodiment comprises an isocyanate compound, the (NCO group/OH group) equivalent ratio is preferably 0.5 to 3.0, more preferably 0.6 to 2.0 and further more preferably 0.7 to 1.5. The coating composition having the (NCO group/OH group) equivalent ratio in the above-described range provides a coated film that is improved in a molecular weight and is excellent in such properties as heat resistance and chemical resistance. The isocyanate compound used in the present embodiment is preferably any of polyisocyanates derived from aliphatic and/or alicyclic isocyanate compounds. Specific examples include, but not particularly limited to, polyisocyanates derived from aliphatic or alicyclic diisocyanates such as hexamethylene diisocyanate (HDI) and isophorone diisocyanate (IPDI). In addition, these polyisocyanates blocked with blocking agents such as lower alcohols such as butanol and 2-ethylhexanol, methylethyl ketone oxime, lactams, phenols, imidazoles, and active methylene compounds, that is, so-called blocked isocyanate-based curing agents can be used.

<Organic Solvents>

The coating composition of the present embodiment may comprise 1 to 95% by mass of an organic solvent, if desired, in order to adjust the workability at the time of application. The content of the organic solvent is preferably 15 to 75% by mass and more preferably 30 to 60% by mass. The organic solvent used is, but not particularly limited to, preferably a solvent that is substantially inert to an isocyanate compound and has no active hydrogen. Examples of the organic solvent include, but not particularly limited to, hydrocarbons such as pentane, hexane, heptane, octane, decane, petroleum ether, petroleum benzine, ligroin, petroleum spirits, cyclohexane and methylcyclohexane; fluorine-based inert liquids such as trichlorofluoroethane, tetrachlorodifluoroethane, perfluoroether and other fluorinated oils; and perfluorocyclohexane, perfluoro(butyltetrahydrofuran), perfluorodecalin, perfluoro-n-butylamine, perfluoropolyether and dimethylpolysiloxane. These organic solvents may be used alone or as a mixture thereof. Further examples of the organic solvent include single or mixed solvents of methyl ethyl ketone, acetone, ethyl acetate, butyl acetate, toluene, xylene, and the like.

<Polyols>

The coating composition of the present embodiment may comprise 4-oxa-1,7-heptanediol, a diol compound (C) represented by the formula (C), a polyether polyol, a polyester polyol, a polycarbonate polyol, an acrylic polyol or a fluoropolyol, depending on the intended use. The use of the coating composition of the present embodiment, containing a polyether polyol or a polyester polyol, can provide chemical resistance as compared to the use thereof alone. The use of the coating composition of the present embodiment, containing an acrylic polyol or a fluoropolyol, can provide flexibility or scratch resistance as compared to the use thereof alone.

<Additives>

Polyurethane particles may be used in the coating composition of the present embodiment in order to further enhance the flexibility of the resulting coated film. A matting agent (such as ACEMATT(R)TS-100 manufactured by Evonik Operations GmbH) may be also used to obtain a matte-tone coated film. The coating composition of the present embodiment may have an additive added thereto, depending on each type of uses, such as a curing accelerator (catalyst), a filler, a flame retardant, a dye, an organic or inorganic pigment, a mold release agent, a flow modifier, a plasticizer, an antioxidant, an ultraviolet absorber, a light stabilizer, an antifoamer, a leveling agent (such as BYK-331 manufactured by BYK-Chemie), a colorant, a color protecting agent (such as SILCLEAN 3700 manufactured by BYK-Chemie) or a solvent. These may be used alone or in combination of two or more.

[Aqueous Polyurethane Dispersion]

The aqueous polyurethane dispersion of the present embodiment comprises a water-dispersible polyurethane obtained by using the polycarbonate diol described above, and water.

<Water-Dispersible Polyurethane>

The water-dispersible polyurethane comprised in the aqueous polyurethane dispersion of the present embodiment can be obtained from the above-described polycarbonate diol, an isocyanate compound, and a polyol containing a carboxyl group and/or a sulfone group or a salt thereof.

<Isocyanates>

The above-described isocyanate compound is not particularly limited as long as it is an isocyanate compound containing two or more isocyanate group in one molecule. Examples of the isocyanate compound include aromatic, aliphatic and alicyclic organic diisocyanates such as diphenylmethane diisocyanate (MDI), cyclohexane diisocyanate, tolylene diisocyanate (TDI), HDI, trimethylhexane diisocyanate, 1,5-naphthalene diisocyanate (NDI), xylylene diisocyanate (XDI), 2,6-diisocyanate methyl caproate, IPDI, methylcyclohexane-2,4- (or 2,6-) diisocyanate and dicyclohexylmethane diisocyanate (hydrogenated MDI); and multimers containing polyfunctional isocyanates such as a biuret form and isocyanurate form thereof. These isocyanate compounds may be used alone or as a mixture thereof.

<Polyols or Salts Thereof>

The polyol containing a carboxyl group and/or a sulfone group or a salt thereof used in the present embodiment is a component that is used for the introduction of a carboxylate group or a sulfonate group for the purpose of self-emulsifying a water-dispersible polyurethane in water and of imparting dispersion stability to an aqueous polyurethane dispersion. Examples of the polyol containing a carboxyl group include, but not particularly limited to, 2,2-dimethylolpropionic acid (DMPA), 2,2-dimethylolbutanoic acid, 2,2-dimethylolheptanoic acid and 2,2-dimethyloloctanoic acid. Examples of the polyol containing a sulfone group include sulfonic acid diol {3-(2,3-dihydroxypropoxy)-1-propanesulfonic acid} and sulfamic acid diol {N,N-bis(2-hydroxyalkyl)sulfamic acid}, and alkylene oxide adducts thereof. Examples of the salts of these polyols containing a carboxyl group and/or a sulfone group include, but not particularly limited to, ammonium salts, salts of amines having 1 to 12 carbon atoms [salts of primary amines (primary monoamines, such as methylamine, ethylamine, propylamine and octylamine), salts of secondary monoamines (dimethylamine, diethylamine and dibutylamine), salts of tertiary monoamines (aliphatic tertiary monoamines such as trimethylamine, triethylamine, triethanolamine, N-methyldiethanolamine and N,N-methylethanolamine; heterocyclic tertiary monoamines such as N-methylpiperidine and N-methylmorpholine; aromatic ring-containing tertiary monoamines such as benzyldimethylamine, α-methylbenzyldimethylamine and N-dimethylaniline)], salts of alkali metals (sodium, potassium and lithium cation), and a combination of two or more thereof.

Among these salts, amine salts are preferable, salts of aliphatic tertiary monoamines are more preferable, and triethylamine salts are particularly preferable.

When the polyols are not salts but are polyols containing a carboxyl group and/or a sulfone group, the carboxyl group and/or a sulfone group can be neutralized with a neutralizing agent to provide a carboxylate group and/or sulfonate group.

Examples of the neutralizing agent include, but not particularly limited to, alkaline compounds that form the cations mentioned as the above counterions. Specific examples include, but not particularly limited to, ammonia, amines having 1 to 12 carbon atoms [primary amines (primary monoamines, such as methylamine, ethylamine, propylamine and octylamine), secondary monoamines (dimethylamine, diethylamine and dibutylamine), tertiary monoamines (aliphatic tertiary monoamines such as trimethylamine, triethylamine, triethanolamine, N-methyldiethanolamine and N,N-methylethanolamine; heterocyclic tertiary monoamines such as N-methylpiperidine and N-methylmorpholine; aromatic ring-containing tertiary monoamines such as benzyldimethylamine, α-methylbenzyldimethylamine and N-dimethylaniline)], alkali metals (sodium, potassium and lithium cation), alkali metal hydroxides, and a combination of two or more thereof.

Among them, amines are preferable, aliphatic tertiary monoamines are more preferable, and triethylamine is particularly preferable.

The amount of the polyol containing a carboxyl group and/or a sulfone group or a salt thereof used is preferably such an amount that the proportion of the carboxyl group and/or the sulfone group is 0.01 to 10 mol % of based on the water-dispersible polyurethane. The proportion of the carboxyl group and/or the sulfone group based on the water-dispersible polyurethane is more preferably 0.1 to 7 mol % and further more preferably 0.5 to 5 mol %. The proportion of the carboxyl group and/or the sulfone group of 0.01 mol % or more tends to provide excellent emulsion stability. The proportion of the carboxyl group and/or the sulfone group of 10 mol % or less tends to provide a coated film more excellent in water resistance.

<Additives>

Also, the aqueous polyurethane dispersion of the present embodiment may comprise a surfactant. Examples of the surfactant include, but not particularly limited to, anionic surfactants, representatively fatty acids, resin acids, acidic fatty alcohols, sulfate esters, higher alkyl sulfonate, alkylaryl sulfonate, sulfonated castor oil and sulfosuccinate esters; and nonionic surfactants, representatively known reaction products of ethylene oxide and long-chain fatty alcohols or phenols.

<Process for Producing Aqueous Polyurethane Dispersion>

Examples of the method for producing the aqueous polyurethane dispersion of the present embodiment include the following method, but not particularly limited thereto. An isocyanate compound having two or more isocyanate groups in one molecule, a polycarbonate diol, and a polyol containing a carboxyl group and/or a sulfone group or a salt thereof are subjected to urethanization reaction at the (NCO group/OH group) equivalent ratio in the range of preferably 0.5 to 1.5, more preferably 0.8 to 1.2 and further more preferably 0.9 to 1.1 in the presence or absence of an organic solvent having no active hydrogen-containing group in a molecule (such as acetone, methyl ethyl ketone, tetrahydrofuran or N,N-dimethylformamide) by a one-shot method or a multi-step method to synthesize a polyurethane, and the resulting polyurethane is neutralized with a neutralizing agent if necessary. Thereafter, the resulting reaction liquid was vigorously stirred and water is added dropwise thereto, followed by, if necessary, removing the solvent after completion of the dropwise addition, to obtain an aqueous polyurethane dispersion. Alternatively, the reaction liquid may be added to and dispersed in water with stirring, followed by, if necessary, removing the solvent, to obtain an aqueous polyurethane dispersion.

When the (NCO group/OH group) equivalent ratio is 0.5 or more, the molecular weight of the resulting polyurethane can be increased, a more stable aqueous polyurethane dispersion tends to be obtained, and further, a coated film formed from a water-based coating composition comprising such an aqueous polyurethane dispersion as a component tend to be more excellent in strength and flexibility. When the (NCO group/OH group) equivalent ratio is 1.5 or less, similarly, the molecular weight of the resulting polyurethane can be increased, a more stable aqueous polyurethane dispersion tends to be obtained, and further, a coated film formed from a water-based coating composition comprising such an aqueous polyurethane dispersion as a component tend to be more excellent in strength and flexibility.

Alternatively, the method for producing the aqueous polyurethane dispersion of the present embodiment may be a method in which an isocyanate compound, a polycarbonate diol and a polyol containing a carboxyl group and/or a sulfone group or a salt thereof is previously reacted under conditions of isocyanate excess to synthetize a prepolymer, the prepolymer is dispersed in water and a chain extender is then added thereto to obtain an aqueous polyurethane dispersion.

Examples of the chain extender include, but not particularly limited to, water; short-chain diols such as ethylene glycol, 1,3-propanediol and 1,4 butanediol; and polyamines such as hydrazine, ethylenediamine, diethylenetriamine, triethylenetetramine, tetraethylenepentamine, pentaethylenehexamine, propylenediamine, hexamethylenediamine and cyclohexylenediamine. The amount of the chain extender added is usually 0 to 1.2 mol and preferably 0.1 to 0.6 mol, relative to 1 mol of the isocyanate group of the urethane prepolymer.

In the course of producing the aqueous polyurethane dispersion of the present embodiment, a known urethanization reaction catalyst may be used if necessary. Examples of the urethanization reaction catalyst include, but not particularly limited to, amine catalysts (such as triethylamine, N-ethylmorpholine and triethylenediamine), tin-based catalysts (such as dibutyltin dilaurate, dioctyltin dilaurate and tin octylate) and titanium-based catalysts (such as tetrabutyl titanate).

The aqueous polyurethane dispersion of the present embodiment preferably has a solid content of 10 to 70% by mass and more preferably 20 to 60% by mass.

The polyurethane in the aqueous polyurethane dispersion of the present embodiment preferably has a particle size of 500 nm or less, more preferably 200 nm or less and further preferably 150 nm or less. The particle size of the polyurethane is preferably 500 nm or less, because a water-based coating composition containing the aqueous polyurethane dispersion tends to provide a coated film that is excellent in appearance, strength and abrasion resistance.

[Water-Based Coating Composition]

A water-based coating composition of the present embodiment comprises the above-described aqueous polyurethane dispersion.

The content of the above-described aqueous polyurethane dispersion in the water-based coating composition of the present embodiment is preferably 10 to 98% by mass, more preferably 20 to 95% by mass and further more preferably 30 to 90% by mass.

The water-based coating composition of the present embodiment may have an additive added thereto, depending on each type of uses, such as a filler, a flame retardant, a dye, an organic or inorganic pigment, a mold release agent, a flow modifier, a plasticizer, an antioxidant, an ultraviolet absorber, a light stabilizer, an antifoamer, a leveling agent, a colorant or a solvent.

Examples of the filler and pigment used include, but not particularly limited to, those commonly used, such as woven fabrics, glass fibers, carbon fibers, polyamide fibers, mica, kaolin, bentonite, metal powders, azo pigments, carbon black, clay, silica, talc, gypsum, alumina white, barium carbonate and resin fine particles. In order to obtain a soft feel, among them, the resin fine particles are preferable and polyurethane fine particles are more preferable.

Examples of the mold release agent, flow modifier and leveling agent used include, but not particularly limited to, silicones, Aerosil, waxes, stearate salts, polysiloxanes such as BYK-331 (manufactured by BYK-Chemie).

In the water-based coating composition of the present embodiment, at least an antioxidant, a light stabilizer and a heat stabilizer are preferably used as additives. Examples of the antioxidant that can be used include, but not particularly limited to, phosphorus compounds such as aliphatic, aromatic and alkyl group-substituted aromatic esters of phosphoric acid and phosphorus acid, hypophosphorous acid derivatives, phenylsulfonic acid, phenylphosphinic acid, diphenylphosphonic acid, polyphosphonate, dialkylpentaerythritol diphosphite and dialkylbisphenol A diphosphite; phenolic derivatives, particularly hindered phenol compounds; sulfur-containing compounds such as thioether-based compounds, dithioate salt-based compounds, mercaptobenzimidazole-based compounds, thiocarbanilide-based compounds and thiodipropionate esters; and tin compounds such as tin malate and dibutyltin monoxide. These may be used alone or in combination of two or more.

Examples of the method for applying the water-based coating composition include, but not particularly limited to, a method in which each of additive components is mixed with the water-based coating composition followed by applying it to a substrate by spraying, rolling, brushing or the like.

[Elastomers]

An elastomer of the present embodiment can be obtained by reacting the polycarbonate diol described above with an isocyanate compound.

<Isocyanates>

The isocyanate compound used in producing the elastomer of the present embodiment is not particularly limited as long as it is an isocyanate compound containing two or more isocyanate groups in one molecule. Examples of the isocyanate compound include aromatic, aliphatic and alicyclic organic diisocyanates such as MDI, cyclohexane diisocyanate, TDI, HDI, trimethylhexane diisocyanate, NDI, XDI, 2,6-diisocyanate methyl caproate, IPDI, methylcyclohexane-2,4-(or 2,6-)diisocyanate and hydrogenated MDI; and multimers containing polyfunctional isocyanates such as a biuret form and isocyanurate form thereof. These isocyanate compounds may be used alone or as a mixture thereof.

<Chain Extenders>

A chain extender as a copolymerization component may be also used in producing the elastomer of the present embodiment. The chain extender that may be used in combination with water, a low-molecular-weight polyol, a polyamine or a high-molecular-weight polyol.

The low-molecular-weight polyol usually used is a diol having a molecular weight of 300 or less. Examples of the low-molecular-weight polyol include, but not particularly limited to, aliphatic diols such as ethylene glycol, 1,3-propanediol, 1,4-butanediol, 1,5-pentanediol, 1,6-hexanediol, neopentyl glycol and 1,10-decanediol; alicyclic diols such as 1,1-cyclohexanedimethanol, 1,4-cyclohexanedimethanol and tricyclodecanedimethanol; aromatic ring-containing diols such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl] sulfone and 1,1-bis[4-(2-hydroxyethoxy)phenyl] cyclohexane. Ethylene glycol and 1,4-butanediol are suitably used.

Examples of the polyamine include, but not particularly limited to, hydrazine, ethylenediamine, diethylenetriamine, triethylenetetramine, tetraethylenepentamine, pentaethylenehexamine, propylenediamine, hexamethylenediamine, cyclohexylenediamine and isophorone diamine.

Examples of the high-molecular-weight polyol include, but not particularly limited to, polyether polyols, polyester polyols and polycarbonate polyols.

<Catalysts>

In the course of producing the elastomer of the present embodiment, a known urethanization reaction catalyst may be used if necessary. Examples of the urethanization reaction catalyst include, but not particularly limited to, amine catalysts (such as triethylamine, N-ethylmorpholine and triethylenediamine), tin-based catalysts (such as dibutyltin dilaurate, dioctyltin dilaurate and tin octylate) and titanium-based catalysts (such as tetrabutyl titanate).

<Solvents>

In the course of producing the elastomer of the present embodiment, a solvent may be used. Examples of the preferred solvent include, but not particularly limited to, dimethylformamide, diethylformamide, dimethylacetamide, dimethyl sulfoxide, tetrahydrofuran, methyl isobutyl ketone, dioxane, cyclohexanone, methyl ethyl ketone, benzene, toluene and ethyl cellosolve.

<Stabilizers>

The elastomer of the present embodiment may comprise a stabilizer. Examples of the stabilizer include a heat stabilizer and a light stabilizer. Examples of the heat stabilizer that can be used include, but not particularly limited to, phosphorus compounds such as aliphatic, aromatic and alkyl group-substituted aromatic esters of phosphoric acid and phosphorus acid, hypophosphorous acid derivatives, phenylsulfonic acid, phenylphosphinic acid, diphenylphosphonic acid, polyphosphonate, dialkylpentaerythritol diphosphite and dialkylbisphenol A diphosphite; phenolic derivatives, particularly hindered phenol compounds; sulfur-containing compounds such as thioether-based compounds, dithioate salt-based compounds, mercaptobenzimidazole-based compounds, thiocarbanilide-based compounds and thiodipropionate esters; and tin compounds such as tin malate and dibutyltin monoxide.

Examples of the light stabilizer include, but not particularly limited to, ultraviolet absorbing type-light stabilizers and radical scavenging-type light stabilizers. Examples of the ultraviolet absorbing type-light stabilizer include, but not particularly limited to, benzotriazole-based and benzophenone-based compounds. Examples of the radical scavenging-type light stabilizer include, but not particularly limited to, hindered amine compounds.

These stabilizers may be used alone or in combination of two or more. The amount of each of the stabilizers added is 0.01 to 5 parts by mass, preferably 0.1 to 3 parts by mass, and more preferably 0.2 to 2 parts by mass, relative to 100 parts by mass of the elastomer obtained by reacting the above-described polycarbonate diol and isocyanate compound.

<Plasticizers>

The elastomer of the present embodiment may comprise a plasticizer. Examples of the plasticizer include, but not particularly limited to, phthalate esters such as dioctyl phthalate, dibutyl phthalate, diethyl phthalate, butyl benzyl phthalate, di-2-ethylhexyl phthalate, diisodecyl phthalate, diundecyl phthalate and diisononyl phthalate; phosphate esters such as tricresyl phosphate, triethyl phosphate, tributyl phosphate, tri-2-ethylhexyl phosphate, trimethylhexyl phosphate, tris(chloroethyl) phosphate and tris(dichloropropyl) phosphate; trimellitate esters such as octyl trimellitate ester and isodecyl trimellitate ester; dipentaerythritol esters; fatty acid esters such as dioctyl adipate, dimethyl adipate, di-2-ethylhexyl azelate, dioctyl azelate, dioctyl sebacate, di-2-ethylhexyl sebacate and methyl acetyl ricinoleate; pyromellitate esters such as octyl pyromellitate ester; epoxy-based plasticizers such as epoxidized soybean oil, epoxidized linseed oil and epoxidized fatty acid alkyl esters; polyester-based plasticizers such as adipic acid ether ester and polyether; liquid rubbers such as liquid NBR, liquid acrylic rubber and liquid polybutadiene; and non-aromatic paraffin oils.

These plasticizers may be used alone or in combination of two or more. The amount of the plasticizer added is appropriately selected according to the hardness and physical properties required, but is preferably 0.1 to 50 parts by mass per 100 parts by mass of the elastomer obtained by reacting the above-described polycarbonate diol and isocyanate compound.

<Additives>

The elastomer of the present embodiment may comprise an additive. Examples of the additive include, but not particularly limited to, inorganic fillers, lubricants, colorants, silicone oils, foaming agents and flame retardants. Specific examples include, but not particularly limited to, calcium carbonate, talc, magnesium hydroxide, mica, barium sulfate, silicic acid (white carbon), titanium oxide and carbon black. Each of these various additives can be used in the amount commonly used in conventional elastomers.

<Molecular Weight>

The molecular weight of each of the elastomers of the present embodiment is preferably in the range of 5,000 to 200,000 as a number average molecular weight (Mn) in terms of polystyrene measured by gel permeation chromatography (GPC) analysis.

The elastomers of the present embodiment obtained as described above are excellent in flexibility, heat resistance, low temperature properties, weather resistance, strength, moldability and the like. Therefore, they are extremely useful as raw materials for various molded products such as automobile parts, home appliance parts, toys and miscellaneous goods, particularly raw materials for molded products requiring strength such as hoses, sheets and industrial belts; interior and exterior parts for automobiles such as wind moldings, bumpers, instrument panel skins and grips; spandex; and molded products requiring flexibility such as watch bands and soles.

<Process for Producing Elastomer>

Examples of the method for producing the elastomer of the present embodiment include, but not particularly limited, as follows. An isocyanate compound having two or more isocyanate groups in one molecule, a polycarbonate diol, and a chain extender are subjected to urethanization reaction at the (NCO group/active proton group) equivalent ratio in the range of preferably 0.5 to 1.5, more preferably 0.8 to 1.2 and further more preferably 0.9 to 1.1 in the presence or absence of an organic solvent having no active hydrogen-containing group in a molecule (such as acetone, methyl ethyl ketone, tetrahydrofuran or N,N-dimethylformamide) by a one-shot method or a multi-step method. The obtained elastomer or elastomer solution may be processed into pellets, or may be applied to a substrate to provide a film. Each of stabilizers, plasticizers and additives may be added at any time.

EXAMPLES

The present invention will be now described in more detail with reference to Examples below and the like, but the present embodiments are not limited by these Examples in any way.

In the following Examples and Comparative Examples, the physical properties of each of polycarbonate diols and polyurethane films were tested according to any of the following test method.

<Test Methods>

[1. OH Value]

An acetylation reagent was prepared by diluting 12.5 g of acetic anhydride with 50 mL of pyridine in a measuring flask. 2.5 to 5.0 Grams of a sample was precisely weighed out and placed into a 100 mL eggplant-shaped flask. Five milliliters of the acetylation reagent and 10 mL of toluene were added with a whole pipette, and a condenser tube was then attached to the flask, and the mixture was stirred and heated at 100° C. for one hour. 2.5 Milliliters of distilled water was added with a whole pipette, and the mixture was heated and stirred for additional 10 minutes. After cooling for two or three minutes, 12.5 mL of ethanol was added, and two or three drops of phenolphthalein were added as an indicator and titrated with 0.5 mol/L ethanolic potassium hydroxide. Five milliliters of the acetylation reagent, 10 mL of toluene and 2.5 mL of distilled water were placed in a 100 mL eggplant-shaped flask, heated and stirred for 10 minutes, and then titrated in the same manner (a blank test). Based on the results, the OH value was calculated according to the following expression (3):

$$\text{OH Value (mg-KOH/g)} = \{(d-c) \times 28.05 \times f\}/e \quad (3)$$

c: Volume of titrant added to a sample (mL)
d: Volume of titrant in blank test (mL)
e: Sample mass (g)
f: Titrant factor

[2. Number Average Molecular Weight]

Substantially all the terminals of each polycarbonate diol obtained in each Example and Comparative Example were a hydroxyl group as measured by $^{13}$C-NMR (270 MHz). The acid value of each polycarbonate diol was 0.01 or less as measured by titration with KOH. Then, the number average molecular weight of each polycarbonate diol was calculated according to the following expression (4).

$$\text{Number average molecular weight} = 2/(\text{OH value} \times 10^{-3}/56.11) \quad (4)$$

[3. Proportion of Repeating Unit Represented by Above Formula (A)]

The proportion of the repeating unit represented by the formula (A) was determined according to the following procedure.

1) To a 100 mL eggplant-shaped flask was added M g (approximately 1 g) of a polycarbonate diol, 30 g of ethanol and 4 g of potassium oxide and they were allowed to react at 100° C. for one hour to obtain an hydrolyzate.

2) The hydrolyzate was allowed to cool to room temperature followed by addition of two or three drops of phenolphthalein, was neutralized with hydrochloric acid and was cooled in a refrigerator for one hour.

3) C mol (approximately 0.5 g) of diethylene glycol diethyl ether was added as an internal standard, and the precipitated salt was removed by filtration.

4) By gas chromatography, the peak area ratio D of the peak area of 4-oxa-1,7-heptanediol to the peak area of the internal standard was determined under the following conditions:

System: GC-2014 Gas Chromatograph (a product manufactured by Shimadzu Corporation, Japan);
Column: DB-WAX (a product manufactured by J & W, USA);
Detector: FID; and Temperature rise profile: holding at 100° C. for five minutes followed by raising the temperature to 250° C. at 10° C./minute, and then holding at that temperature for 10 minutes.

5) 0.1 Gram of 4-oxa-1,7-heptanediol, 0.5 g of an internal standard (diethylene glycol diethyl ether) and 30 g of ethanol were mixed and gas chromatography analysis was carried out under the same conditions as in 4) above to calculate a factor f.

6) The proportion of the repeating unit represented by the formula (A) was calculated from the peak area ratio D and the factor f according to the following expression:

Proportion of repeating unit represented by formula (A) = (f × C × D × 160/M) × 100 wherein "160" represents the molecular weight of the repeating unit represented by the formula (A).

[4. Proportion of Repeating Unit Represented by Above Formula (B)]

The proportion of the repeating unit represented by the formula (B) was determined according to the following procedure.

1) To a 100 mL eggplant-shaped flask was added M g (approximately 1 g) of a polycarbonate diol, 30 g of ethanol and 4 g of potassium oxide and they were allowed to react at 100° C. for one hour to obtain an hydrolyzate.

2) The hydrolyzate was allowed to cool to room temperature followed by addition of two or three drops of phenolphthalein, was neutralized with hydrochloric acid and was cooled in a refrigerator for one hour.

3) C mol (approximately 0.5 g) of diethylene glycol diethyl ether was added as an internal standard, and the precipitated salt was removed by filtration.

4) By gas chromatography, the peak area ratio D' of the peak area of each diol (C) to the peak area of the internal standard was determined under the following conditions:

System: GC-2014 Gas Chromatograph (a product manufactured by Shimadzu Corporation, Japan);
Column: DB-WAX (a product manufactured by J & W, USA);
Detector: FID; and Temperature rise profile: holding at 100° C. for five minutes followed by raising the temperature to 250° C. at 10° C./minute, and then holding at that temperature for 10 minutes.

5) 0.1 Gram of each diol (C), 0.5 g of an internal standard (diethylene glycol diethyl ether) and 30 g of ethanol were mixed and gas chromatography analysis was carried out under the same conditions as in 4) above to calculate a factor f'.

6) The proportion of the repeating unit represented by the formula (B) corresponding to each diol (C) was calculated from the peak area ratio D' and the factor f' according to the following expression:

Proportion of repeating unit represented by formula (B) corresponding to each diol (C) = (f' × C × D' × Mw/M) × 100 wherein Mw represents the molecular weight of the repeating unit represented by the formula (B) corresponding to each diol (C).

7) The proportion represented by the formula (B) was the sum of the proportion of the repeating unit represented by the above formula (B) corresponding to each diol (C) calculated in the above 6).

[5. Proportion of Primary Hydroxyl Terminal]

The proportion of the primary hydroxyl terminal of the polycarbonate diol obtained in each of Examples and Comparative Examples was determined according to the following procedure.

The proportion of the primary hydroxyl terminal was calculated from the integral values of peaks of $^1$H-NMR measured at 400 MHz (ECS400 manufactured by JEOL Ltd., Japan) for a polycarbonate diol dissolved in CDCl$_3$ (deuterated chloroform). The proportion of the primary hydroxyl terminal was determined from the ratio of the integral value for one proton of the primary hydroxyl terminal to the sum of the integral value for one proton of all the hydroxyl terminals of the polycarbonate diol and the integral value for one proton of carbonate ester-derived terminals such as a phenoxide terminal. The detection limit of the proportion of the primary hydroxyl terminal is 0.1 mol % based on the entire structure of the terminals of the polycarbonate diol.

[6. Stain Resistance]

A polyurethane film or elastomer film having a thickness of 0.04 to 0.06 mm prepared on a white plate was colored with a red oil-based pen (Magic Ink, manufactured by Teranishi Chemical Industry Co., Ltd.). After one hour, the colored portion of each film was rinsed off with acetone and dried at 23° C. for 10 minutes. The stain resistance of each film was evaluated based on the color difference ΔE* between the color before coloration with the oil-based pen and the color after rinsing as follows. The colors of the coated plate both before and after the test were measured with a color meter (manufactured by Suga Test Instruments Co., Ltd.; Model Number: SM-P45) according to the CIELab color system, and ΔE* was calculated according to the following expression (6):

$$\Delta E^* = \sqrt{(L^*-L^*_0)^2 + (a-a^*_0)^2 + (b^*-b^*_0)^2} \quad (6)$$

wherein the CIE color values before the test=$L^*_0, a^*_0, b^*_0$; and the CIE color values after the test=$L^*, a^*, b^*$).

◎: 0<ΔE*≤5
○: 5<ΔE*≤10
Δ: 10<ΔE*≤30
x: 30<ΔE*

[7. Low Temperature Flexibility]

A polyurethane film or elastomer film having a thickness of 0.04 to 0.06 mm was formed on a glass plate, and cut out into a strip having a width of 10 mm and a length of 50 mm. This film was subjected to a tensile test under the conditions of a distance between chucks of 20 mm, a tensile rate of 5 mm/min and a temperature of −20° C. using a universal testing machine (manufactured by ZwickRoell GmbH & Co KG), to determine breaking elongation. The low temperature flexibility of each film was evaluated based on the breaking elongation as follows.

○: 100% or more of breaking elongation
Δ: 30% or more and less than 100% of breaking elongation
x: less than 30% of breaking elongation

[8. Heat Resistance]

A polyurethane film or elastomer film having a thickness of 0.04 to 0.06 mm was formed on a glass plate, and cut out into a strip having a width of 10 mm and a length of 50 mm. This film was heated at 120° C. for one week. The film, both before and after heating, was subjected to a tensile test under the conditions of a distance between chucks of 20 mm, a tensile rate of 5 mm/min and room temperature using a universal testing machine (manufactured by ZwickRoell GmbH & Co KG), to determine breaking strength. The retention percent of the breaking strength was calculated from the breaking strength by the following expression:

Retention percent of breaking strength=breaking strength of film after heating/breaking strength of film before heating×100

The heat resistance of each film was evaluated based on the calculated retention rate of breaking strength as follows.

◎: 50% or more of retention rate of breaking strength
○: 30% or more and less than 50% of retention rate of breaking strength
Δ: less than 30% of retention rate of breaking strength
x: Melt and could not be measured

[9. Particle Size of Polyurethane in Aqueous Polyurethane Dispersion]

The particle size of the polyurethane in the aqueous polyurethane dispersion obtained in each of Examples and Comparative Examples was measured with a particle size analyzer Nanotrac 150 (manufactured by Microtrac).

[10. Number Average Molecular Weight of Elastomer]

The number average molecular weight of the elastomer obtained in each of Examples and Comparative Examples was measured by gel permeation chromatography (GPC). The GPC system used was an HLC-8220 GPC system manufactured by Tosoh Corporation, and detection was carried out with an RI detector. Developing solvent: dimethylformamide (DMF); flow rate: 1 ml/min; and operating temperature: 40° C. The number average molecular weight was calculated in terms of polystyrene.

Example 1

Into a 2 L separable flask provided with a stirrer, a thermometer and an Oldershaw column having a reflux head on the overhead thereof with a vacuum jacket were charged 2 g of 4-oxa-1,7-heptanediol, 370 g of 1,3-propanediol and 430 g of ethylene carbonate, followed by addition of 0.08 g of titanium tetrabutoxide as a catalyst. The mixture was subjected to reaction at a flask internal temperature of 140 to 180° C. and under a vacuum degree of 15 to 3 kPa for 18 hours while removing a part of the distillate from the reflux head. Then, the vacuum degree was lowered to 0.01 to 3 kPa at a flask internal temperature of 140 to 180° C., and 4-oxa-1,7-heptanediol, 1,3-propanediol and ethylene carbonate remaining in the separable flask were removed. This reaction provided a liquid polycarbonate diol (PCD1) that was viscous at normal temperature.

Examples 2 to 12

Each of liquid polycarbonate diols (PCD2 to PCD12) that was viscous at normal temperature was obtained in the same manner as in Example 1 except that the types and the amount charged of raw materials were changed as shown in Table 1.

Comparative Example 1

Into a 2 L separable flask provided with a stirrer, a thermometer and an Oldershaw column having a reflux head on the overhead thereof with a vacuum jacket were charged 654 g of 4-oxa-1,7-heptanediol and 430 g of ethylene carbonate, followed by addition of 0.08 g of titanium tetrabutoxide as a catalyst. The mixture was subjected to reaction at a flask internal temperature of 140 to 180° C. and under a vacuum degree of 15 to 3 kPa for 18 hours while removing a part of the distillate from the reflux head. Then, the vacuum degree was lowered to 0.01 to 3 kPa at a flask internal temperature of 140 to 180° C., and 4-oxa-1,7-heptanediol and ethylene carbonate remaining in the separable flask were removed. This reaction provided a liquid polycarbonate diol (PCD13) that was viscous at normal temperature.

Comparative Examples 2, 3, 7 and 8

Each of liquid polycarbonate diols (PCD14, PCD15, PCD17 and PCD18) was obtained in the same manner as in Example 1 except that the types and the amount charged of raw materials were changed as shown in Table 1.

Comparative Example 4

In a 1 L reaction vessel provided with an oil circulation tank, a stirrer, a distillate trap and a pressure regulator were charged 1,6-hexanediol (232.9 g), dipropylene glycol (113.3 g) and diphenyl carbonate (553.8 g), followed by addition of 1.8 mL of an aqueous solution of magnesium acetate tetrahydrate (210 mg/25 mL) with a syringe. Then, the atmosphere in the reaction vessel was substituted with nitrogen repeatedly three times. After substituted with nitrogen, the temperature of the oil circulation tank was first raised (to 190 to 200° C.) until the internal temperature reached 165° C., to heat and dissolve the contents. After raising the temperature and dissolving the contents, the pressure was then reduced to 130 torr in five minutes, and polymerization was thereafter allowed to proceed at an internal temperature of 165° C. under a pressure of 130 torr for 90 minutes while distilling phenol. Then, while stepwisely reducing the pressure in the reaction vessel to 60 torr over 90 minutes and thereafter to 2 torr over 60 minutes, polymerization was allowed to proceed while distilling phenol and unreacted diols. Finally, the internal temperature was raised to 170° C., and the viscous liquid obtained by the reaction at an internal temperature of 170° C. and under a pressure of 2 torr for 120 minutes was subjected to thin-film distillation at a flow rate of 20 g/min (temperature: 160° C.; pressure: 0.027 kPa) to obtain a polycarbonate diol PCD16.

[Production of Polyisocyanate]

The inside of a four-necked flask provided with a stirrer, a thermometer, a reflux condenser, a nitrogen blowing tube and a dropping funnel was made under a nitrogen atmosphere, 600 g of hexamethylene diisocyanate was charged into the flask, and the temperature inside the reactor was kept at 70° C. under stirring. Tetramethylammonium capriate as an isocyanuration catalyst was added, and when the yield reached 24 mol %, phosphoric acid was added to terminate the reaction. After filtering the reaction liquid, unreacted hexamethylene diisocyanate was removed using a thin film evaporator to obtain a polyisocyanate as a production example. The obtained polyisocyanate had a viscosity at 25° C. of 1,600 mPa·s, an isocyanate group concentration of 23.0% by mass, a number average molecular weight of 660 and a residual HDI concentration of 0.2% by mass.

[Preparation of Coating Composition]

To a glass sample bottle were added 15 g of the polycarbonate diol obtained in each of Examples and Comparative Examples, 18 g of butyl acetate, and the polyisocyanate synthesized above, so that the (NCO group/OH group) equivalent ratio was 1.05, followed by shaking well with a shaker. After confirming that the solution became uniform, 0.2 g of 1 mol % dibutyltin dilaurate was added and shaken well to prepare a coating composition.

[Preparation of Polyurethane Film]

The obtained coating composition was cast on a glass plate or an ABS plate, allowed to stand at room temperature for five minutes to evaporate the solvent, and then dried by placing it in a dryer at 80° C. for one hour to obtain a polyurethane film. The obtained polyurethane film was cured in an environment of an ambient temperature of 23° C. and a humidity of 50% for one week and was used for each evaluation (stain resistance, low temperature flexibility and heat resistance).

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Type of polycarbonate diol | | PCD1 | PCD2 | PCD3 | PCD4 | PCD5 | PCD6 | PCD7 | PCD8 | PCD9 | PCD10 |
| Amount charged (g) | 4-Oxa-1,7-HPL | 2 | 4 | 45 | 138 | 196 | 327 | 481 | 10 | 20 | 6 |
| | 1,3-PRL | 370 | 368 | 346 | 294 | 260 | 186 | 111 | 353 | 319 | 364 |
| | 1,4-BDL | | | | | | | | | | |
| | 1,5-PDL | | | | | | | | | | |
| | 1,6-HDL | | | | | | | | 4 | 60 | 3 |
| | DEG | | | | | | | | 4 | | |
| | 3-Oxa-1,6-HDL | | | | | | | | 12 | 15 | 6 |
| | DPG | | | | | | | | | | |
| | DHDBE | | | | | | | | | | |
| | PTMG250 | | | | | | | | | | |
| | EC | 430 | 430 | 430 | 430 | 430 | 430 | 430 | 430 | 430 | 430 |
| | DPC | | | | | | | | | | |
| Proportion in polycarbonate diol (% by mass) | (A) | 0.5 | 1.2 | 11.6 | 30.0 | 43.0 | 70.2 | 89.0 | 2.5 | 4.0 | 2.0 |
| | (B) 1,3-PRL Derived from | 99.5 | 98.8 | 88.4 | 70.0 | 57.0 | 29.8 | 11.0 | 91.5 | 81.0 | 95.0 |
| | 1,4-BDL Derived from | | | | | | | | | | |
| | 1,5-PDL Derived from | | | | | | | | | | |
| | 1,6-HDL Derived from | | | | | | | | 1.1 | 12.0 | 1.0 |
| | DEG Derived from | | | | | | | | 1.1 | | |
| | 3-Oxa-1,6-HDL Derived from | | | | | | | | 3.8 | 3.0 | 2.0 |
| | DPG Derived from | | | | | | | | | | |
| | DHDBE Derived from | | | | | | | | | | |
| | PTMG250 Derived from | | | | | | | | | | |
| OHV of polycarbonate diol (mg-KOH/g) | | 57.0 | 56.1 | 56.0 | 55.7 | 56.5 | 56.7 | 56.7 | 55.0 | 56.3 | 140.3 |
| Number average molecular weight of polycarbonate diol | | 1969 | 2000 | 2004 | 2015 | 1986 | 1979 | 1979 | 2040 | 1993 | 800 |

TABLE 1-continued

| | | | | | | | | | |
|---|---|---|---|---|---|---|---|---|---|
| Proportion of primary hydroxyl terminal of polycarbonate diol (%) | 100.0 | 100.0 | 100.0 | 100.0 | 100.0 | 100.0 | 100.0 | 100.0 | 100.0 | 100.0 |
| Stain resistance of polyurethane film | ○ | ◎ | ◎ | ◎ | ◎ | ◎ | ◎ | ◎ | ◎ | ◎ |
| Low temperature flexibility of polyurethane film | ○ | ○ | ○ | ○ | ○ | ○ | ○ | ○ | ○ | ○ |
| Heat resistance of polyurethane film | ◎ | ◎ | ◎ | ◎ | ○ | Δ | Δ | ◎ | ◎ | ◎ |

| | | | Example 11 | Example 12 | Comparative Example 1 | Comparative Example 2 | Comparative Example 3 | Comparative Example 4 | Comparative Example 7 | Comparative Example 8 |
|---|---|---|---|---|---|---|---|---|---|---|
| Type of polycarbonate diol | | | PCD11 | PCD12 | PCD13 | PCD14 | PCD15 | PCD16 | PCD17 | PCD18 |
| Amount charged (g) | | 4-Oxa-1,7-HPL | 80 | 328 | 655 | | | | | |
| | | 1,3-PRL | 278 | | | | | | | |
| | | 1,4-BDL | | 220 | | | | | 220 | 308 |
| | | 1,5-PDL | | | | 254 | 254 | | | |
| | | 1,6-HDL | | | | 289 | 289 | 233 | | |
| | | DEG | | | | | | | | |
| | | 3-Oxa-1,6-HDL | 80 | | | | | | | |
| | | DPG | | | | | | 113 | | |
| | | DHDBE | | | | | | | 396 | |
| | | PTMG250 | | | | | | | | 366 |
| | | EC | 430 | 430 | 430 | 430 | 430 | | 430 | 430 |
| | | DPC | | | | | | 554 | | |
| Proportion in polycarbonate diol (% by mass) | (A) | | 20.2 | 58.0 | 100.0 | 0.0 | 0.0 | 0.0 | 0.0 | 0.0 |
| | (B) | 1,3-PRL Derived from | 60.0 | | | | | | | |
| | | 1,4-BDL Derived from | | 42.0 | | | | | 38.2 | 49.5 |
| | | 1,5-PDL Derived from | | | | 47.3 | 46.9 | | | |
| | | 1,6-HDL Derived from | | | | 52.7 | 53.1 | 70.0 | | |
| | | DEG Derived from | | | | | | | | |
| | | 3-Oxa-1,6-HDL Derived from | 19.8 | | | | | | | |
| | | DPG Derived from | | | | | | 30.0 | | |
| | | DHDBE Derived from | | | | | | | 61.8 | |
| | | PTMG250 Derived from | | | | | | | | 50.5 |
| OHV of polycarbonate diol (mg-KOH/g) | | | 140.8 | 55.4 | 57.0 | 57.6 | 139.5 | 38.8 | 56.2 | 58.0 |
| Number average molecular weight of polycarbonate diol | | | 797 | 2026 | 1969 | 1948 | 804 | 2892 | 1997 | 1935 |
| Proportion of primary hydroxyl terminal of polycarbonate diol (%) | | | 100.0 | 100.0 | 100.0 | 100.0 | 100.0 | 53.0 | 100.0 | 100.0 |
| Stain resistance of polyurethane film | | | ◎ | ◎ | ◎ | X | X | X | X | X |
| Low temperature flexibility of polyurethane film | | | ○ | Δ | ○ | Δ | Δ | ○ | ○ | ○ |
| Heat resistance of polyurethane film | | | ◎ | Δ | X | ◎ | ◎ | X | Δ | X |

The OH value (OHV) and the proportion of the primary hydroxyl terminal of the polycarbonate diol of each of Examples and Comparative Examples, and the evaluation results of various properties (stain resistance, low temperature flexibility and heat resistance) when the polycarbonate diol of each of Examples and Comparative Examples was formed into a polyurethane film are shown in Table 1. It was confirmed that the polyurethane produced by using the polycarbonate diol of the present embodiment had excellent stain resistance, low temperature flexibility and heat resistance.

In Table 1, "1,3-PRL" represents 1,3-propanediol; "1,4-BDL" represents 1,4-butanediol; "1,5-PDL" represents 1,5-pentanediol; "1,6-HDL" represents 1,6-hexanediol; "DEG" represents diethylene glycol; "3-Oxa-1,6-HDL" represents 3-oxa-1,6-hexanediol; "4-Oxa-1,7-HDL" represents 4-oxa-1,7-heptanediol; "DPG" represents dipropylene glycol; "DHDBE" represents 4,4'-dihydroxydibutyl ether; "PTMG250" represents a polytetramethylene ether diol having a molecular weight of 250; "EC" represents ethylene carbonate; and "DPC" represents diphenyl carbonate. "(A)" represents a repeating unit represented by the formula (A), and "(B)" represents a repeating unit represented by the formula (B).

Example 13

To a 2 L four-necked flask provided with a stirrer, a condenser tube, a nitrogen inlet and a thermometer, under a nitrogen atmosphere, were added 33.3 g of isophorone diisocyanate (IPDI), 100 g of a polycarbonate diol PCD4, 6.7 g of dimethylolpropionic acid (DMPA), 6.1 g of triethylamine (TEA) and 30 mL of methyl ethyl ketone (MEK), and the mixture was allowed to react at 80° C. for 2.5 hours to obtain an NCO-terminated prepolymer solution. Then, 342 g of deionized water was added and mixed with the prepolymer solution at 35° C. to obtain a prepolymer dispersion liquid. A solution of 1.5 g of ethylenediamine (EDA) in 2.0 g of deionized water was added to the prepolymer dispersion liquid and was stirred at 30° C. for one hour to obtain a polyurethane dispersion liquid. Thereafter, the mixture was heated to 80° C. to remove MEK to obtain an aqueous polyurethane dispersion (PUD16) having a solid content of 30% by mass. The particle size of the polyurethane in the obtained aqueous polyurethane dispersion was measured. The measurement results are shown in Table 2. The obtained aqueous polyurethane dispersion was cast on a glass plate or an ABS plate, cured by allowing it to stand at room temperature for five minutes, and then dried by placing it in a dryer at 80° C. for one hour to obtain a polyurethane film. The obtained polyurethane film was cured in an environment of an ambient temperature of 23° C. and a humidity of 50% for one week and was used for each evaluation (stain resistance and heat resistance). The stain resistance and heat resistance of the obtained polyurethane film are shown in Table 2.

Examples 14 and 15

Each of aqueous polyurethane dispersions (PUD17 and PUD18) and each of polyurethane films were obtained and subjected to each evaluation, in the same manner as in Example 13 except that a polycarbonate diol PCD8 or PCD9 was used instead of the polycarbonate diol PCD4. The particle size of the polyurethane in each of the obtained aqueous polyurethane dispersions and the stain resistance and heat resistance of each of the obtained polyurethane films are shown in Table 2.

Comparative Example 5

An aqueous polyurethane dispersion (PUD19) and a polyurethane film were obtained and subjected to each evaluation, in the same manner as in Example 13 except that a polycarbonate diol PCD14 was used instead of the polycarbonate diol PCD4. The particle size of the polyurethane in the obtained aqueous polyurethane dispersion and the stain resistance and heat resistance of the obtained polyurethane film are shown in Table 2.

TABLE 2

|  | Example 13 | Example 14 | Example 15 | Comparative Example 5 |
|---|---|---|---|---|
| Type of aqueous polyurethane dispersion | PUD16 | PUD17 | PUD18 | PUD19 |
| Type of polycarbonate diol used | PCD4 | PCD8 | PCD9 | PCD14 |
| Particle size of polyurethane in aqueous polyurethane dispersion (nm) | 142 | 123 | 114 | 167 |
| Stain resistance of polyurethane film | ◎ | ◎ | ◎ | X |
| Heat resistance of polyurethane film | ◎ | ◎ | ◎ | ◎ |

Example 16

Thirty grams of a polycarbonate diol PCD4 and 150 g of dimethylformamide were added to a 500 mL four-necked flask provided with a stirrer, a condenser tube, a nitrogen inlet and a thermometer, under a nitrogen atmosphere, and stirred at 40° C. until PCD4 was dissolved. 7.7 Grams (2.05 times mol of PCD4) of MDI was added and stirred for four hours to obtain a prepolymer. Then, 100 ppm of dibutyltin dilaurate was added relative to the total weight of PCD4 and MDI, and 1,4-butanediol was added so that the OH group was 99% relative to the remaining NCO group. The temperature was raised to 80° C. and sampling was carried out every hour with stirring. When it was confirmed by GPC that the target molecular weight was reached, 0.1 g of ethanol was added and the reaction was quenched to obtain an elastomer solution. The number average molecular weight of the obtained elastomer was measured. The measurement results are shown in Table 3. The obtained elastomer solution was cast on a glass plate or a white plate, cured by allowing it to stand at room temperature for five minutes, and then dried by placing it in a dryer at 80° C. for one hour to obtain an elastomer film. The obtained elastomer film was cured in an environment of an ambient temperature of 23° C. and a humidity of 50% for one week and was used for each evaluation (stain resistance and heat resistance). The properties of the obtained elastomer film (TPU21) are shown in Table 3.

Examples 17 and 18

Each of elastomer films was obtained and subjected to each evaluation, in the same manner as in Example 16 except that a polycarbonate diol PCD8 or PCD9 was used instead of the polycarbonate diol PCD4. The number average molecular weight of each of the obtained elastomers and the properties of each of the obtained elastomer films (TPU22 and TPU23) are shown in Table 3.

Comparative Example 6

An elastomer film was obtained and subjected to each evaluation, in the same manner as in Example 16 except that a polycarbonate diol PCD14 was used instead of the polycarbonate diol PCD4. The number average molecular weight of the obtained elastomer and the properties of the obtained elastomer film (TPU24) are shown in Table 3.

TABLE 3

|  | Example 16 | Example 17 | Example 18 | Comparative Example 6 |
|---|---|---|---|---|
| Type of elastomer film | TPU21 | TPU22 | TPU23 | TPU24 |
| Type of polycarbonate diol used | PCD4 | PCD8 | PCD9 | PCD14 |
| Number average molecular weight of elastomer | 57834 | 81265 | 72532 | 39400 |
| Stain resistance of elastomer film | ◎ | ◎ | ◎ | X |
| Heat resistance of elastomer film | ◎ | ◎ | ◎ | ◎ |

The invention claimed is:

1. A polycarbonate diol comprising a repeating unit represented by the following formula (A) in a proportion of 0.1% by mass or more and 89% by mass or less:

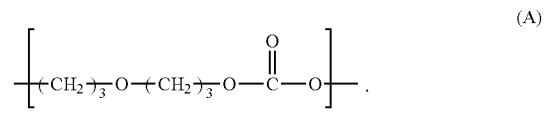

(A)

2. The polycarbonate diol according to claim 1, wherein the proportion of the repeating unit represented by the formula (A) is 0.1% by mass or more and 50.0% by mass or less.

3. The polycarbonate diol according to claim 1, further comprising a repeating unit represented by the following formula (B) in a proportion of 0.1% by mass or more and 99.9% by mass or less:

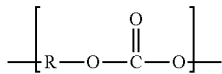 (B)

wherein R represents a divalent hydrocarbon group having 3 to 20 carbon atoms which optionally comprises an oxygen atom in its carbon backbone.

4. The polycarbonate diol according to claim 3, wherein R in the formula (B) has 3 to 6 carbon atoms.

5. The polycarbonate diol according to claim 1, wherein the polycarbonate diol has a number average molecular weight of 300 or more and 4,000 or less.

6. The polycarbonate diol according to claim 1, wherein the polycarbonate diol has a proportion of a primary hydroxyl terminal of 90% or more.

7. A coating composition comprising the polycarbonate diol according to any one of claims 1 to 6.

8. An aqueous polyurethane dispersion comprising a water-dispersible polyurethane obtained by using the polycarbonate diol according to any one of claims 1 to 6, and water.

9. A water-based coating composition comprising the aqueous polyurethane dispersion according to claim 8.

10. An elastomer obtained by reacting the polycarbonate diol according to any one of claims 1 to 6 with an isocyanate compound.

11. The polycarbonate diol according to claim 2, further comprising a repeating unit represented by the following formula (B) in a proportion of 0.1% by mass or more and 99.9% by mass or less:

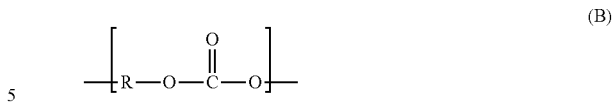

wherein R represents a divalent hydrocarbon group having 3 to 20 carbon atoms which optionally comprises an oxygen atom in its carbon backbone.

12. The polycarbonate diol according to claim 4, wherein the polycarbonate diol has a number average molecular weight of 300 or more and 4,000 or less.

13. The polycarbonate diol according to claim 11, wherein the polycarbonate diol has a number average molecular weight of 300 or more and 4,000 or less.

14. The polycarbonate diol according to claim 3, wherein the polycarbonate diol has a proportion of a primary hydroxyl terminal of 90% or more.

15. The polycarbonate diol according to claim 4, wherein the polycarbonate diol has a proportion of a primary hydroxyl terminal of 90% or more.

16. The polycarbonate diol according to claim 11, wherein the polycarbonate diol has a proportion of a primary hydroxyl terminal of 90% or more.

17. The polycarbonate diol according to claim 3, wherein the sum of the proportion of the repeating unit represented by the formula (A) and the proportion of the repeating unit represented by the formula (B) is 50% by mass or more.

18. The polycarbonate diol according to claim 3, wherein the proportion of the repeating unit represented by the formula (B) is 50.0% by mass or more and 99.9% by mass or less.

19. The polycarbonate diol according to claim 4, wherein the sum of the proportion of the repeating unit represented by the formula (A) and the proportion of the repeating unit represented by the formula (B) is 50% by mass or more.

20. The polycarbonate diol according to claim 4, wherein the proportion of the repeating unit represented by the formula (B) is 50.0% by mass or more and 99.9% by mass or less.

* * * * *